(12) United States Patent
Li

(10) Patent No.: US 10,686,322 B2
(45) Date of Patent: Jun. 16, 2020

(54) ELECTRONIC DEVICE

(71) Applicant: Merry Electronics (Shenzhen) Co., Ltd., ShenZhen (CN)

(72) Inventor: Hung-Yuan Li, New Taipei (TW)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 16/115,567

(22) Filed: Aug. 29, 2018

(65) Prior Publication Data

US 2019/0386493 A1 Dec. 19, 2019

(30) Foreign Application Priority Data

Jun. 14, 2018 (TW) .............................. 107120491 A

(51) Int. Cl.
*H02J 7/00* (2006.01)
*H04R 3/00* (2006.01)

(52) U.S. Cl.
CPC ............ *H02J 7/007* (2013.01); *H02J 7/0068* (2013.01); *H04R 3/00* (2013.01)

(58) Field of Classification Search
CPC .. H02J 7/007; H02J 7/0068; H02J 7/02; H02J 7/04; H02J 7/045; H02J 7/0011; H02J 7/0018; H02J 7/0055; H02J 7/0065; H04R 3/00

USPC .......................... 381/123; 320/136, 137, 160
See application file for complete search history.

(56) References Cited

U.S. PATENT DOCUMENTS

| 5,164,652 | A | * | 11/1992 | Johnson | ............... | H01M 6/5066 |
| | | | | | | 320/106 |
| 5,506,490 | A | * | 4/1996 | DeMuro | ................ | H02J 7/0011 |
| | | | | | | 320/106 |
| 2006/0244422 | A1 | * | 11/2006 | DiGiovanna | ......... | G06F 1/3203 |
| | | | | | | 320/137 |

* cited by examiner

*Primary Examiner* — Norman Yu
(74) *Attorney, Agent, or Firm* — JCIPRNET

(57) ABSTRACT

An electronic device is provided. The electronic device includes an input/output port, a rechargeable battery, a charging device, and an audio receiving and playing device. The rechargeable battery is charged to provide a battery voltage in response to switching between a first charging power source and a second charging power source. The charging device converts the DC input power source into the first charging power source or the second charging power source to charge the rechargeable battery according to the detection signal associated with the battery voltage. A charging speed of the first charging power source for charging the rechargeable battery is greater than a charging speed of the second charging power source for charging the rechargeable battery. The audio receiving and playing device performs at least one of a playing operation and a receiving operation of an audio signal by operating under the battery voltage.

10 Claims, 3 Drawing Sheets

ELECTRONIC DEVICE

CROSS-REFERENCE TO RELATED APPLICATION

This application claims the priority benefit of Taiwan application serial no. 107120491, filed on Jun. 14, 2018. The entirety of the above-mentioned patent application is hereby incorporated by reference herein and made a part of this specification.

BACKGROUND OF THE INVENTION

Field of the Invention

The invention is related to an electronic device, and particularly to an electronic device having a charging device and a rechargeable battery.

Description of Related Art

In development of the current electronic device, rechargeable battery is disposed in electronic device so that the electronic device can further support wireless communication technology. In charging technology of the rechargeable battery in the electronic device, in order to shorten charging time, a charging power source having greater charging current may be provided for charging the rechargeable battery at a fast speed. However, in the condition that the rechargeable battery is charged at a fast speed under a greater battery voltage, a lithium metal surface is easily at the anode electrode of the rechargeable battery. The lithium metal surface is precipitate that is generated when the rechargeable battery is continuously charged at a fast speed under a greater battery voltage. The lithium metal surface is accumulated due to fast charging under the condition described above. Under the condition that the electronic device is charged at a fast speed for a long time, such accumulation causes the power capacity of the rechargeable battery to be reduced or cause internal short-circuit of the rechargeable battery. Therefore, it is desirable to develop an electronic device that increases charging speed while reducing damage to the battery during charging operation.

SUMMARY OF THE INVENTION

The invention provides an electronic device, capable of increasing charging speed while reducing damage to the battery in charging operation.

An electronic device of the invention includes an input/output port, a rechargeable battery, a charging device and an audio receiving and playing device. The input/output port is configured to receive a direct-current (DC) input power source. The rechargeable battery is charged to provide a battery voltage in response to switching between a first charging power source and a second charging power source. The charging device is coupled between the input/output port and the rechargeable battery. The charging device is configured to receive the DC input power source through the input/output port and converts the DC input power source into the first charging power source or the second charging power source for charging the rechargeable battery according to a detection signal associated with the battery voltage. A charging speed of the first charging power source for charging the rechargeable battery is greater than a charging speed of the second charging power source for charging the rechargeable battery. The audio receiving and playing device is coupled to the rechargeable battery. The audio receiving and playing device is configured to perform at least one of playing operation and receiving operation of an audio signal by operating under the battery voltage.

Based on the above, the electronic device of the invention converts the DC input power source into the first charging power source or the second charging power source for charging the rechargeable battery according to the detection signal associated with the battery voltage, thereby increasing charging speed while reducing damage to the battery in charging operation.

In order to make the aforementioned features and advantages of the invention more comprehensible, embodiments accompanying figures are described in detail below.

DESCRIPTION OF EMBODIMENTS

Figure 1:
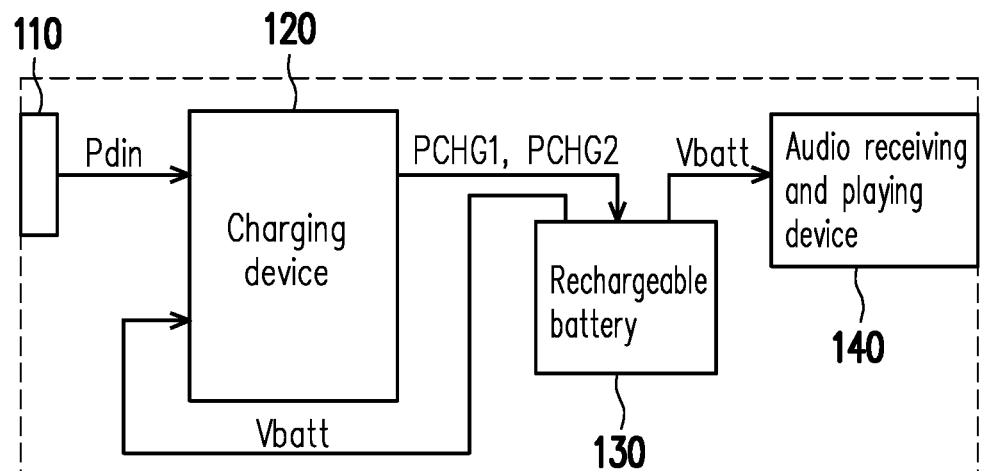
FIG. 1 is a schematic view of an electronic device according to a first embodiment of the invention.

Referring to FIG. 1, FIG. 1 is a schematic view of an electronic device according to first embodiment of the invention. In the embodiment, an electronic device 100 includes an input/output port 110, a charging device 120, a rechargeable battery 130 and an audio receiving and playing device 140. The input/output port 110 is configured to receive a direct-current (DC) input power source Pdin. The charging device 120 is coupled between the input/output port 110 and the rechargeable battery 130. The charging device 120 is configured to receive the DC input power source Pdin through the input/output port 110. The charging device 120 converts the DC input power source Pdin into a first charging power source PCHG1 or a second charging power source PCHG2 according to a battery voltage Vbatt of the rechargeable battery 130, and provides the first charging power source PCHG1 or the second charging power source PCHG2 to the rechargeable battery 130. The rechargeable battery 130 is charged in response to the switching between the first charging power source PCHG1 and the second charging power source PCHG2. The rechargeable battery 130 provides the stored battery voltage Vbatt to the audio receiving and playing device 140. The audio receiving and playing device 140 is coupled to the rechargeable battery 130. The audio receiving and playing device 140 is configured to perform at least one of the playing operation and the receiving operation of the audio signal by operating under the battery voltage Vbatt. The input/output port 110 of the embodiment may be a connection port that supports a universal serial bus (USB) in any forms or a DC power source connection port in any forms. The electronic device 100 of the embodiment may be an earphone or a speaker player and so on.

Figure 2:
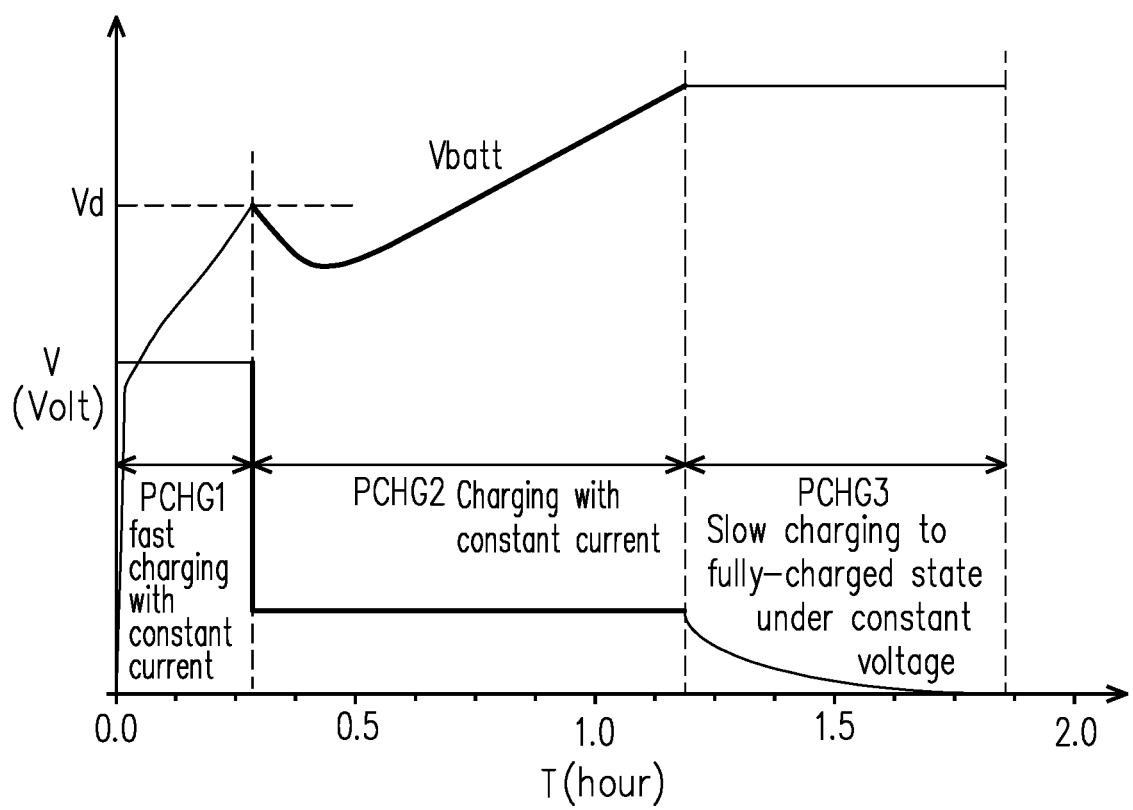
FIG. 2 is a schematic waveform diagram of a first charging power source, a second charging power source and a battery voltage according to an embodiment of the invention.

Referring to FIG. 1 and FIG. 2, FIG. 2 is a schematic waveform diagram of a first charging power source, a second charging power source and a battery voltage according to an embodiment of the invention. In the embodiment, the charging device 120 generates a detection signal DS according to the battery voltage Vbatt of the rechargeable battery 130, and provides the first charging power source PCHG1 or the second charging power source PCHG2 through the detection signal DS. In the embodiment shown in FIG. 1 and FIG. 2, the charging device 120 is configured to detect whether the voltage value of the battery voltage Vbatt is smaller than a predetermined voltage value Vd (e.g., 4.0V or other voltage). When the charging device 120 detects that the voltage value of the battery voltage Vbatt is smaller than the predetermined voltage value Vd, the charging device 120 provides the direction signal DS corresponding to the voltage value of the battery voltage Vbatt that is smaller than the predetermined voltage value Vd. The charging device 120 provides the first charging power source PCHG1 through the detection signal DS. On the contrary, when the charging device 120 detects that the voltage value of the battery voltage Vbatt is larger than or equal to the predetermined voltage value Vd, the charging device 120 provides the detection signal DS that corresponds to the voltage value of the battery voltage Vbatt larger than or equal to the predetermined voltage value Vd. The charging device 120 provides the second charging power source PCHG2 through the detection signal DS. The first charging power source PCHG1 and the second charging power source PCHG2 of the embodiment belong to charging power source with constant current. The charging device 120 provides the first charging power source PCHG1 and the second charging power source PCHG2 for charging the rechargeable battery 130 such that the rechargeable battery 130 can reach a fully-charged state (e.g., making the voltage value of the battery voltage Vbatt to reach 4.2V) or nearly reach the fully-charged state. In the embodiment, when the rechargeable battery 130 nearly reaches the fully-charged state, for example, the voltage value of the battery voltage Vbatt reaches 93% of the voltage value in the fully-charged state, the charging device 120 may provide a third charging power source PCHG3 having constant voltage for charging the rechargeable battery 130, such that the rechargeable battery 130 can reach the fully-charged state from the nearly fully-charged state.

In the embodiment, the power of the first charging power source PCHG1 is greater than the power of the second charging power source PCHG2. In other words, the charging speed of the first charging power source PCHG1 for charging the rechargeable battery 130 is greater than the charging speed of the second charging power source PCHG2 for charging the rechargeable battery 130. In this manner, the electronic device 100 can perform fast charging operation on the rechargeable battery 130 through the first charging power source PCHG1 under a lower battery voltage Vbatt, thereby increasing the charging speed for charging the rechargeable battery 130. Moreover, the electronic device 100 can perform charging operation on the rechargeable battery 130 through the second charging power source PCHG2 under a higher battery voltage Vbatt, thereby reducing damage to the rechargeable battery 130 in the charging operation.

In some embodiments, the charging device 120 may perform slow charging operation on the rechargeable battery 130 under a low voltage state. When the rechargeable battery 130 in the low voltage state is charged at a slow speed, and the voltage value of the battery voltage Vbatt reaches a specific voltage value (e.g., 3V or other voltage) that is lower than a predetermined voltage value Vd, the charging device 120 begins to provide the first charging power source PCHG1 for charging the rechargeable battery 130 at a fast speed. In this manner, the voltage value of the battery voltage Vbatt can be boosted from the specific voltage value to the predetermined voltage value Vd.

The waveform shown in FIG. 2 serves as an example only. In FIG. 2, the voltage value of the battery voltage Vbatt is decreased when the second charging power source PCHG2 begins to be received for charging. In some embodiments, the voltage value of different battery voltage Vbatt is not decreased when the second charging power source PCHG2 begins to be received for charging. The waveform shown in FIG. 2 may vary depending on the type of the rechargeable battery 130.

In other embodiments, the charging device 120 may detect the voltage value of the battery voltage Vbatt, the first predetermined voltage value, the second predetermined voltage value and generates the detection signal DS according to the comparison result of the above voltage values. For example, when the charging device 120 detects that the voltage value of the battery voltage Vbatt is smaller than the first predetermined voltage value, the charging device 120 provides the detection signal DS that corresponds to the voltage value of the battery voltage Vbatt smaller than the first predetermined voltage value. The charging device 120 provides the first charging power source PCHG1 for fast charging the rechargeable battery 130 with constant current through the detection signal DS. When the charging device 120 detects that the voltage value of the battery voltage Vbatt is larger than or equal to the first predetermined voltage value and smaller than the second predetermined voltage value, the charging device 120 provides the detection signal DS corresponding to the voltage value of the battery voltage Vbatt that is larger than or equal to the first predetermined voltage value and smaller than the second predetermined voltage value. The charging device 120 provides the second charging power source PCHG2 for fast charging the rechargeable battery 130 with constant current through the detection signal DS. When the charging device 120 detects that the voltage value of the battery voltage Vbatt is larger than the second predetermined voltage value, the charging device 120 provides the detection signal DS corresponding to the voltage value of the battery voltage Vbatt that is larger than the second predetermined voltage value. The charging device 120 provides other charging power source for charging the rechargeable battery 130 with a constant voltage through the detection signal DS. In the invention, the number of the predetermined voltage value and the number of the charging power source for fast charging are not limited to the embodiments shown in FIG. 1 and FIG. 2. The number of the predetermined voltage value of the invention and the number of the charging power source for fast charging may be adjusted depending on the specification of the rechargeable battery.

Figure 3:
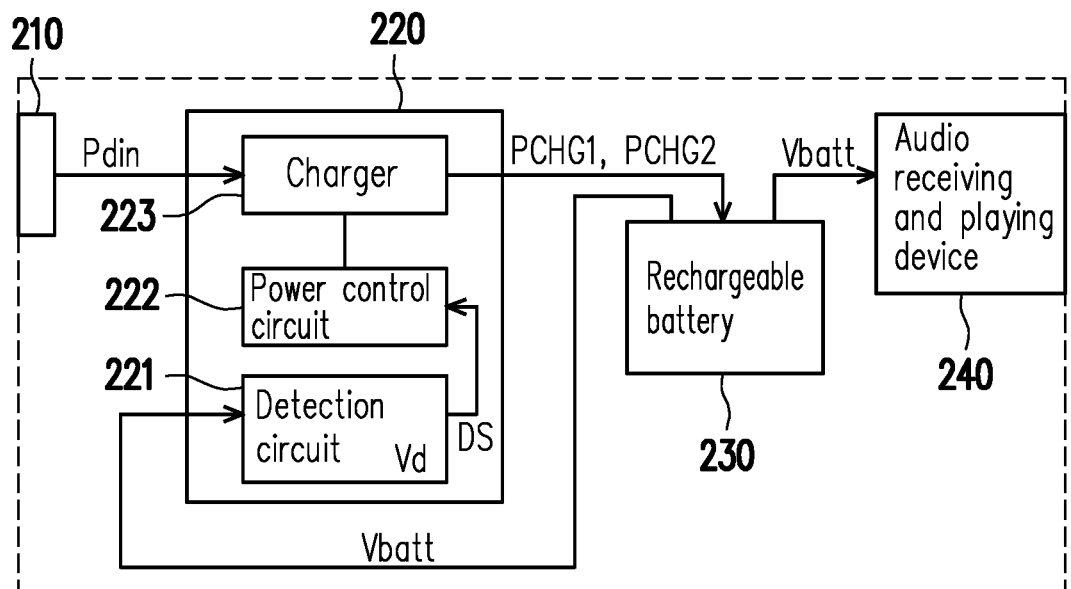
FIG. 3 is a schematic view of an electronic device according to a second embodiment of the invention.

Furthermore, referring to FIG. 3, FIG. 3 is a schematic view of an electronic device according to a second embodiment of the invention. In the embodiment, a charging device 220 of an electronic device 200 includes a detection circuit 221, a power control circuit 222 and a charger 223. The detection circuit 221 is coupled between a rechargeable battery 230 and the power control circuit 222. The detection circuit 221 is configured to provide the predetermined voltage value Vd, and detects whether the voltage value of the battery voltage Vbatt is smaller than the predetermined voltage value Vd to generate the detection signal DS. The power control circuit 222 is coupled between the detection circuit 221 and the charger 223. The power control circuit 222 is configured to control the charger 223 to generate a first setting current ISET1 or a second setting current ISET2 according to the detection signal DS. In the embodiment, when the detection circuit 221 detects that the voltage value of the battery voltage Vbatt is smaller than the predetermined voltage value Vd, the detection circuit 221 provides the detection signal DS corresponding to the voltage value of the battery voltage Vbatt that is smaller than the predetermined voltage value Vd. At this time, the power control circuit 222 receives the detection signal DS and controls the charger 223 to generate the first setting current ISET1 according to the detection signal DS. On the contrary, when the detection circuit 221 detects that the voltage value of the battery voltage Vbatt is larger than or equal to the predetermined voltage value Vd, the detection circuit 221 provides the detection signal DS corresponding to the voltage value of the battery voltage Vbatt that is larger than or equal to the predetermined voltage value Vd. At this time, the power control circuit 222 receives the detection signal DS and controls the charger 223 to generate the second setting current ISET2 according to the detection signal DS. The current value of the first setting current ISET1 is larger than the current value of the second setting current ISET2.

The charger 223 is coupled between the input/output port and the rechargeable battery 230. The charger 223 is configured to receive the DC input power source Pdin through the input/output port. The charger 223 is further configured to convert the DC input power source Pdin into the first charging power source PCHG1 according to the first setting current ISET1, or convert the DC input power source Pdin into the second charging power source PCHG2 according to the second setting current ISET2. In the embodiment, the charger 223 provides the first charging power source PCHG1 having the first charging current according to the first setting current ISET1 for charging the rechargeable battery 230. The charger 223 also provides the second charging power source PCHG2 having the second charging current according to the second setting current ISET2 for charging the rechargeable battery 230. A ratio of the current value of the first charging current to the current value of the first setting current ISET1 is equal to a ratio of the current value of the second charging current to the current value of the second setting current ISET2.

For example, when the power control circuit 222 receives the detection signal DS corresponding to the voltage value of the battery voltage Vbatt that is smaller than the predetermined voltage value Vd, the power control circuit 222 controls the charger 223 to generate the first setting current ISET1 having the current value of, for example, 170 mA according to the detection signal DS. At this time, the charger 223 provides the first charging current (e.g., 170 mA) according to the first setting current ISET1, thereby generating the first charging power source PCHG1 having the first charging current. Relatively, when the power control circuit 222 receives the detection signal DS corresponding to the voltage value of the battery voltage Vbatt that is larger than or equal to the predetermined voltage value Vd, the power control circuit 222 controls the charger 223 to generate the second setting current ISET2 having the current value of, for example, 42.5 mA according to the detection signal DS. At this time, the charger 223 provides the second charging current (e.g., 42.5 mA) according to the second setting current ISET2, thereby generating the second charging power source PCHG2 having the second charging current. In the embodiment, the current value of the first setting current ISET1 is four times the current value of the second setting current ISET2. Therefore, the current value of the first charging current is also four times the current value of the second charging current.

In another example, the charging device 220 of the embodiment may perform 2 C charging operation on the rechargeable battery 230 through the first charging power source PCHG1, and perform 0.5 C charging operation on the rechargeable battery 230 through the second charging power source PCHG2. Specifically, the current value of the first charging current may be four times the current value of the second charging current.

In the invention, a ratio of the current value of the first charging current to the current value of the first setting current ISET1 may be any real number larger than zero. Additionally, in the invention, the current value of the first setting current ISET1 and the current value of the second setting current ISET2 may be set according to the need in use. The setting condition in which the current value of the first setting current ISET1 is larger than the current value of the second setting current ISET2 belongs to the scope to be protected by the invention.

It should be noted that the charging device 220 may provide the first charging power source PCHG1 having greater charging current under the condition that the voltage value of the battery voltage Vbatt is smaller than the predetermined voltage value Vd, thereby increasing the charging speed for charging the rechargeable battery 230. In addition, the charging device 220 may provide the second charging power source PCHG2 having smaller charging current under the condition that the voltage value of the battery voltage Vbatt is larger than or equal to the predetermined voltage value Vd, thereby reducing the damage to the battery when the rechargeable battery 230 is about to be completely charged.

Figure 4:
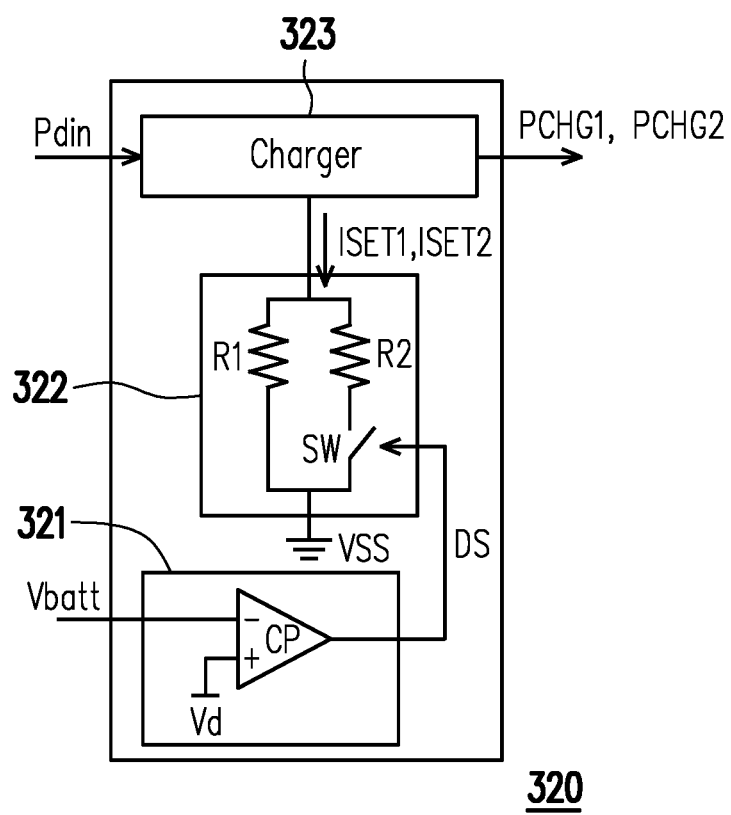
FIG. 4 is a schematic view of a charging device according to an embodiment of the invention.

Referring to FIG. 4, FIG. 4 is a schematic view of a charging device according to an embodiment of the invention. In the embodiment, a detection circuit 321 of a charging device 320 includes a comparator CP. A non-inverse input terminal of the comparator CP is configured to receive the predetermined voltage value Vd, an inverse input terminal of the comparator CP is configured to receive the battery voltage Vbatt, and the output terminal of the comparator CP is coupled to a power control circuit 322. The power control circuit 322 includes a resistor R1, a resistor R2 and a switch SW. The first terminal of the resistor R1 is coupled to a charger 323, the second terminal of the resistor R1 is coupled to a reference voltage source VSS. In the embodiment, the reference voltage source VSS may be a ground terminal. The first terminal of the resistor R2 is coupled to the charger 323 and the first terminal of the resistor R1. The first terminal of the switch SW is coupled to the second terminal of the resistor R2, the second terminal of the switch SW is coupled to the reference voltage source VSS, the control terminal of the switch SW is configured to receive the detection signal DS and subject to the detection signal DS. In the embodiment, the switch SW may be, for example, an n-type metal-oxide-semiconductor FET (MOSFET). In the embodiment, the reference voltage source VSS may be a ground power source.

In the embodiment, the comparator CP of the detection circuit 321 receives the battery voltage Vbatt and the predetermined voltage value Vd, and compares the battery voltage Vbatt with the predetermined voltage value Vd to obtain the detection signal DS. When the voltage value of the battery voltage Vbatt is smaller than the predetermined voltage value Vd, the comparator CP generates the detection signal DS at high voltage level to turn on the switch SW, such that the second terminal of the resistor R2 is coupled to the reference voltage source VSS. In the condition that the resistor R1 and the resistor R2 are coupled to the reference voltage source VSS, the resistor R1 and the resistor R2 are connected in parallel to generate an equivalent resistance such that the charger 323 generates the first setting current ISET1 according to the equivalent resistance. Moreover, the charger 323 generates the first charging power source PCHG1 according to the first setting current ISET1. In some embodiments, the charger 323 has a setting voltage. The charger 323 may generate the first setting current ISET1 according to the setting voltage and the equivalent resistance generated by the resistor R1 and the resistor R2 connected in parallel.

On the contrary, when the voltage value of the battery voltage Vbatt is larger than or equal to the predetermined voltage value Vd, the comparator CP generates the detection signal DS at low voltage level to turn off the switch SW, such that the second terminal of the resistor R2 is floated. In the condition that the resistor R2 is floated, the charger 323 generates the second setting current ISET2 according to the resistance of the resistor R1. Moreover, the charger 323 generates the second charging power source PCHG2 according to the second setting current ISET2. In some embodiments, the charger 323 has a setting voltage. The charger 323 may generate the first setting current ISET1 according to the setting voltage and the resistance of the resistor R1.

It should be noted that, in the embodiment, the switch SW is controlled according to the comparison result of the battery voltage Vbatt and the predetermined voltage value Vd compared by the comparator CP, and the first setting current ISET1 or the second setting current ISET2 is generated according to the resistance generated by the resistor R1 and the resistor R2. With such configuration of the hardware circuit, as compared with firmware configuration, it is possible to avoid unknown reason such as noise interference that causes crash, which leads to misjudgment when the battery voltage Vbatt and the predetermined voltage value Vd are compared. In this manner, the circuit configuration of the embodiment may further effectively protect the rechargeable battery.

In other embodiments, the inverse input terminal of the comparator CP of the detection circuit 321 is configured to receive the predetermined voltage value Vd, the non-inverse input terminal of the comparator CP is configured to receive the battery voltage Vbatt. With such configuration, when the voltage value of the battery voltage Vbatt is smaller than predetermined voltage value Vd, the comparator CP generates the detection signal DS at low voltage level, and the detection circuit 321 may further include a buffer (not shown). The buffer may invert the logic level of the detection signal DS generated by the comparator CP, thereby generating the inverted detection signal DS (i.e., generating detection signal DS at high voltage level) to turn on the switch SW.

Figure 5:
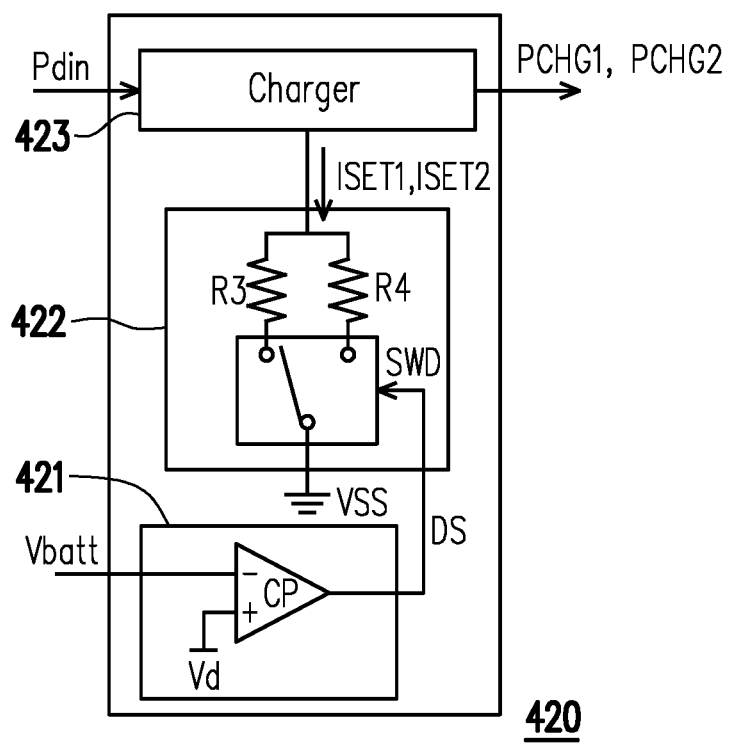
FIG. 5 is a schematic view of a charging device according to another embodiment of the invention.

Referring to FIG. 5, FIG. 5 is a schematic view of a charging device according to another embodiment of the invention. FIG. 5 is different from the embodiment of FIG. 4 in that a power control circuit 422 includes a resistor R3, a resistor R4 and a switching circuit SWD. The first terminal of the resistor R3 is coupled to a charger 423. The first terminal of the resistor R4 is coupled to the charger 423 and the first terminal of the resistor R3. The first terminal of the switching circuit SWD is coupled to the second terminal of the resistor R3, between the second terminal of the resistor R3 and the reference voltage source VSS, and the switching circuit SWD is subject to the detection signal DS. Apart from the above, the resistance of the resistor R3 is smaller than the resistance of the resistor R4.

In the embodiment, when the voltage value of the battery voltage Vbatt is smaller than the predetermined voltage value Vd, the power control circuit 422 makes the resistor R3 to be connected to the reference voltage VSS according to the detection signal DS corresponding to the voltage value of the battery voltage Vbatt that is smaller than the predetermined voltage value Vd, such that the charger 423 generates the first setting current ISET1 according to the resistance of the resistor R3. On the contrary, when the voltage value of the battery voltage Vbatt is larger than or equal to the predetermined voltage value Vd, the power control circuit 422 makes the resistor R4 to be connected to the reference voltage source VSS according to the detection signal DS corresponding to the voltage value of the battery voltage Vbatt that is larger than or equal to the predetermined voltage value Vd, such that the charger 423 generates the second setting current ISET2 according to the resistance of the resistor R4.

Figure 6:
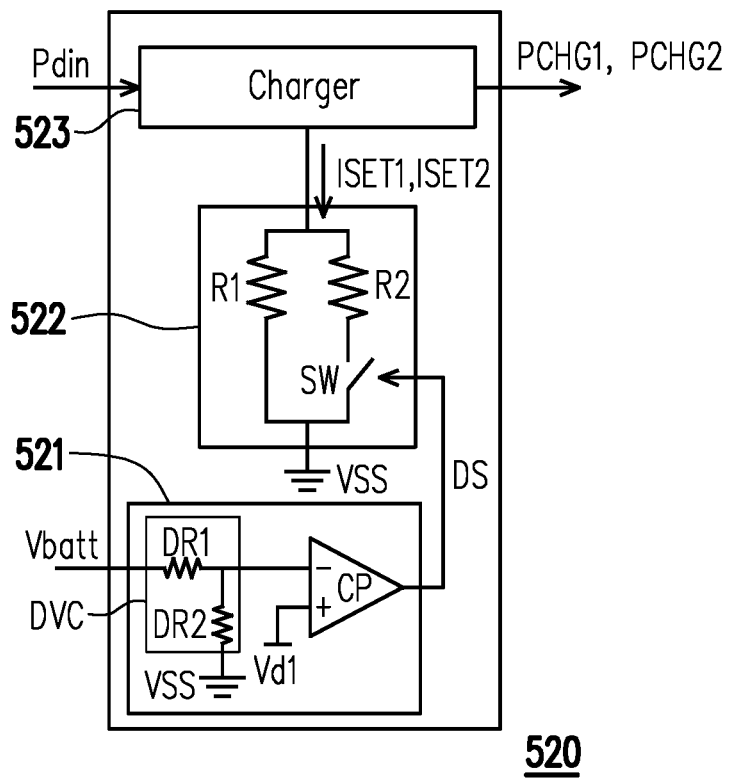
FIG. 6 is a schematic view of a charging device according to still another embodiment of the invention.

Referring to FIG. 6, FIG. 6 is a schematic view of a charging device according to still another embodiment of the invention. FIG. 6 is different from the embodiment of FIG. 4 in that a detection circuit 521 further includes a dividing circuit DVC. The dividing circuit DVC is coupled between the rechargeable battery and the comparator CP, and configured to perform dividing operation on the battery voltage Vbatt to provide the divided battery voltage Vbatt to the comparator CP. The dividing circuit DVC includes a dividing resistor DR1 and a dividing resistor DR2. The first terminal of the dividing resistor DR1 is coupled to the rechargeable battery, and the second terminal of the dividing resistor DR1 is coupled to the inverse input terminal of the comparator CP. The first terminal of the dividing resistor DR2 is coupled to the second terminal of the dividing resistor DR1 and the inverse input terminal of the comparator CP, the second terminal of the dividing resistor DR2 is coupled to the reference voltage source VSS.

Since the dividing circuit DVC of the embodiment may perform dividing operation on the battery voltage Vbatt, on the premise that the battery voltage Vbatt can be divided to generate the divided battery voltage Vbatt, the detection circuit 521 of the embodiment may provide a lower predetermined voltage value Vd1. In this manner, the comparator CP can compare the divided battery voltage Vbatt with the lower predetermined voltage value Vd1 to generate the detection signal DS.

In summary, the electronic device of the invention converts the DC input power source into the first charging power source or the second charging power source for charging the rechargeable battery according to the detection signal associated with the battery voltage. Since the charging speed of the first charging power source for charging the rechargeable battery is greater than the charging speed of the second charging power source for charging the rechargeable battery, when the rechargeable battery has lower battery voltage, the rechargeable battery is charged through the first charging power source so as to increase the charging speed for charging the rechargeable battery. When the rechargeable battery has higher battery voltage, the rechargeable battery is charged through the second charging power source so as to reduce damage to the battery in charging operation.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic device, comprising:
an input/output port, configured to receive a direct-current (DC) input power source;
a rechargeable battery, configured to perform charging in response to switching between a first charging power source and a second charging power source, thereby providing a battery voltage;
a charging device, coupled between the input/output port and the rechargeable battery, configured to receive the DC input power source through the input/output port, and convert the DC input power source into the first charging power source or the second charging power source for charging the rechargeable battery according to a detection signal associated with the battery voltage, wherein a charging speed of the first charging power source for charging the rechargeable battery is greater than a charging speed of the second charging power source for charging the rechargeable battery, wherein the charging device comprises:
a detection circuit, coupled between the rechargeable battery and a power control circuit, configured for:
providing a predetermined voltage value,
detecting whether a voltage value of the battery voltage is smaller than the predetermined voltage value to generate the detection signal, wherein the detection circuit comprises:
a comparator, wherein an inverse input terminal of the comparator is configured to receive the battery voltage, a non-inverse input terminal of the comparator is configured to receive the predetermined voltage value, and an output terminal of the comparator is coupled to the power control circuit;
a charger, coupled between the input/output port and the rechargeable battery, configured for:
receiving the DC input power source through the input/output port,
converting the DC input power source into the first charging power source according to a first setting current, and
converting the DC input power source into the second charging power source according to a second setting current, wherein a current value of the first setting current is greater than a current value of the second setting current; and
the power control circuit, coupled between the detection circuit and the charger, configured to control the charger to generate the first setting current or the second setting current according to the detection signal; and
an audio receiving and playing device, coupled to the rechargeable battery, configured to perform at least one of a playing operation and a receiving operation of an audio signal by, operating under the battery voltage.

2. The electronic device according to claim 1, wherein:
the charger provides the first charging power source having a first charging current according to the first setting current for charging the rechargeable battery,
the charger provides the second charging power source having a second charging current according to the second setting current for charging the rechargeable battery,
a current value of the first charging current is greater than a current value of the second charging current.

3. The electronic device according to claim 2, wherein a ratio of a current value of the first setting current to a current value of the second setting cunent is equal to a ratio of the current value of the first charging current to the current value of the second charging current.

4. The electronic device according to claim 1, wherein the power control circuit comprises:
a first resistor, a first terminal of the first resistor coupled to the charger, a second terminal of the first resistor coupled to a reference voltage source;
a second resistor, a first terminal of the second resistor coupled to the charger and the first terminal of the first resistor; and
a switch, a first terminal of the switch coupled to a second terminal of the second resistor, a second terminal of the switch coupled to the reference voltage source, a control terminal of the switch configured to receive the detection signal.

5. The electronic device according to claim 4, wherein:
the power control circuit turns on the switch according to the detection signal corresponding to a voltage value of the battery voltage smaller than the predetermined voltage value, such that the charger generates the first setting current according to an equivalent resistance formed by the first resistor and the second resistor,
the power control circuit turns off the switch according to the detection signal corresponding to the voltage value of the battery voltage larger than or equal to the predetermined voltage value, such that the charger generates the second setting current according to a resistance of the first resistor.

6. The electronic device according to claim 1, wherein the power control circuit comprises:
a first resistor, a first terminal of the first resistor coupled to the charger;
a second resistor, a first terminal of the second resistor coupled to the charger and the first terminal of the first resistor; and
a switching circuit, a first terminal of the switching circuit coupled to a second terminal of the first resistor, between the second terminal of the first resistor and a reference voltage source, the switching circuit subject to the detection signal,
wherein a resistance of the first resistor is smaller than a resistance of the second resistor.

7. The electronic device according to claim 6, wherein:
the power control circuit makes the first resistor to be connected to the reference voltage source according to the detection signal corresponding to a voltage value of the battery voltage smaller than the predetermined voltage value, such that the charger generates the first setting current according to the resistance of the first resistor,
the power control circuit makes the second resistor to be connected to the reference voltage source according to the detection signal corresponding to the voltage value of the battery voltage larger than or equal to the predetermined voltage value, such that the charger generates the second setting current according to the resistance of the second resistor.

8. The electronic device according to claim 1, wherein the detection circuit further comprises:
a dividing circuit, coupled between the rechargeable battery and the comparator, configured to perform a dividing operation on the battery voltage to provide the divided battery voltage to the comparator, the dividing circuit comprising:
- a first dividing resistor, a first terminal of the first dividing resistor coupled to the rechargeable battery, a second terminal of the first dividing resistor coupled to the inverse input terminal of the comparator; and
- a second dividing resistor, a first terminal of the second dividing resistor coupled to a second terminal of the first dividing resistor and the inverse input terminal of the comparator, a second terminal of the second dividing resistor coupled to a reference voltage source.

9. An electronic device, comprising:
an input/output port, configured to receive a direct-current (DC) input power source;
a rechargeable battery, configured to perform charging in response to switching between a first charging power source and a second charging power source, thereby providing a battery voltage;
a charging device, coupled between the input/output port and the rechargeable battery, configured to receive the DC input power source through the input/output port, and convert the DC input power source into the first charging power source or the second charging power source for charging the rechargeable battery according to a detection signal associated with the battery voltage, wherein a charging speed of the first charging power source for charging the rechargeable battery is greater than a charging speed of the second charging power source for charging the rechargeable battery, wherein the charging device comprises:
- a detection circuit, coupled between the rechargeable battery and a power control circuit, configured for:
  providing a predetermined voltage value,
  detecting whether a voltage value of the battery voltage is smaller than the predetermined voltage value to generate the detection signal, wherein the detection circuit comprises:
  - a comparator, wherein an inverse input terminal of the comparator is configured to receive the predetermined voltage value, a non-inverse input terminal of the comparator is configured to receive the battery voltage, and an output terminal of the comparator is coupled to the power control circuit;
- a charger, coupled between the input/output port and the rechargeable battery, configured for:
  receiving the DC input power source through the input/output port,
  converting the DC input power source into the first charging power source according to a first setting current, and
  converting the DC input power source into the second charging power source according to a second setting current, wherein a current value of the first setting current is greater than a current value of the second setting current; and
- the power control circuit, coupled between the detection circuit and the charger, configured to control the charger to generate the first setting current or the second setting current according to the detection signal; and an audio receiving and playing device, coupled to the rechargeable battery, configured to perform at least one of a playing operation and a receiving operation of an audio signal by operating under the battery voltage.

10. The electronic device according to claim 9, wherein the detection circuit further comprises:
a buffer, coupled between the comparator and the power control circuit, configured to invert a logic level of the detection signal generated by the comparator.

\* \* \* \* \*